United States Patent [19]

Baynard

[11] 4,289,724

[45] Sep. 15, 1981

[54] SIMULATED TREE FURNITURE AND METHOD OF MOLDING SAME

[76] Inventor: Shirley Baynard, 7878 N. Main St., Apt. 1-N, Jonesboro, Ga. 30236

[21] Appl. No.: 966,003

[22] Filed: Dec. 4, 1978

[51] Int. Cl.³ .......................... B29C 1/02; B29C 3/00
[52] U.S. Cl. ................................... 264/225; 108/150; 108/161; 249/55; 249/83; 249/112; 264/275; 264/313
[58] Field of Search ................. 249/55, 83, 112, 115, 249/96; 108/150, 161; 428/18, 19, 20; 264/224, 225, 313

[56] References Cited

U.S. PATENT DOCUMENTS

| | | | |
|---|---|---|---|
| 2,508,959 | 5/1950 | Marino | 428/18 |
| 2,565,700 | 8/1951 | Schiller | 428/19 |
| 2,779,058 | 1/1957 | Hyde | 249/83 X |
| 3,584,088 | 6/1971 | Williams | 249/115 X |
| 3,602,476 | 8/1971 | Iragorri | 249/96 |
| 3,619,446 | 11/1971 | Navta | 264/313 |
| 3,641,228 | 2/1972 | Fleck | 264/225 |
| 3,803,277 | 4/1974 | Bassett | 264/225 X |
| 3,844,527 | 10/1974 | Scott | 249/112 X |
| 3,922,135 | 11/1975 | Haller | 249/63 X |
| 3,937,438 | 2/1976 | Fox et al. | 249/127 |
| 3,974,996 | 8/1976 | Violet | 249/112 |
| 4,083,526 | 4/1978 | Hatfield | 249/115 X |
| 4,206,899 | 6/1980 | Whitehead | 264/313 |

FOREIGN PATENT DOCUMENTS

| | | | |
|---|---|---|---|
| 563693 | 8/1957 | Italy | 428/18 |
| 6909933 | 12/1970 | Netherlands | 249/55 |

*Primary Examiner*—James T. McCall
*Attorney, Agent, or Firm*—Schuyler, Banner, Birch, McKie & Beckett

[57] ABSTRACT

The molding process comprises pouring a plastic compound around a natural tree trunk to make a mold which has the tree trunk surface impressed therein. The plastic mold is supported in a frame made from wood which has a galvanized metal support therein. The metal brackets and structural rods are positioned on the base of the frame and a plastic core member may be used and removed to create the hollow interior of the tree trunk base.

3 Claims, 11 Drawing Figures

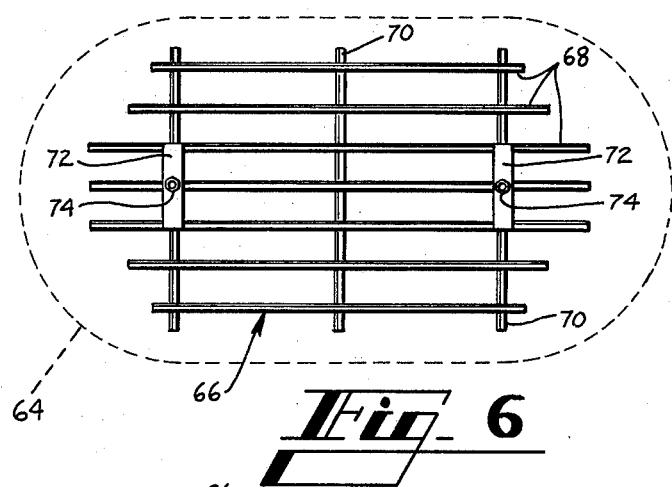
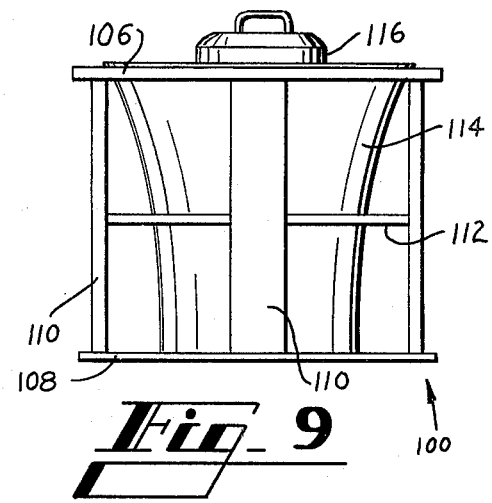
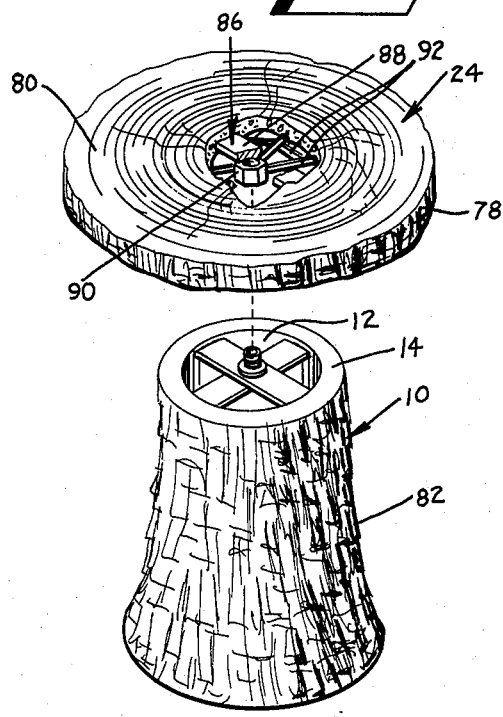
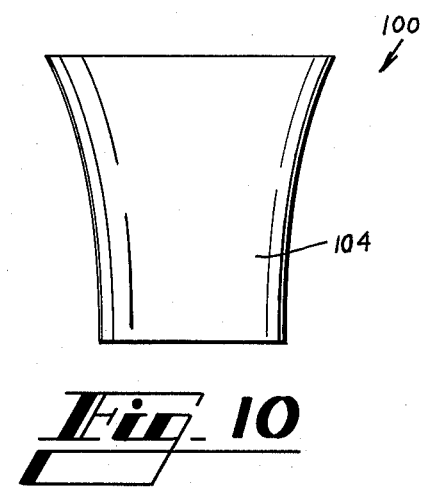
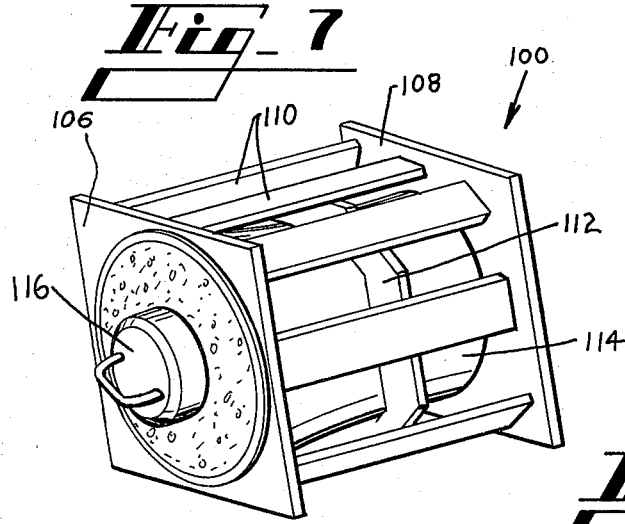
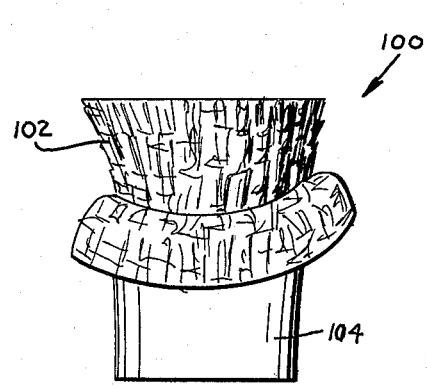

SIMULATED TREE FURNITURE AND METHOD OF MOLDING SAME

BACKGROUND OF THE INVENTION

1. Field of the Invention

Molded concrete furniture and similar items especially simulating and resembling portions of trees. The procedure and method of molding concrete articles such as simulated tree trunks.

2. Description of the Prior Art

Real tree furniture is very desirable for outdoor use. At one time in certain areas of the United States such furniture was easily obtained and was often found in parks and the like. Due to the cost of labor and expense of obtaining trees and processing same the cost of such furniture is high, non-existant in some areas of the U.S. and in addition the furniture does not last an indefinite period of time in the weather. Ordinary concrete furniture has replaced much of the more attractive furniture made of wood from trees. Such ordinary concrete furniture is the plain molded concrete which of course has a plain dull gray finish and is not attractive in a park or home or rural setting. Heretofore, efforts to simulate or immitate real tree furniture have involved mostly painting or etching regular concrete furniture to attempt to make it look like tree furniture. The result is not very good and the furniture made in this fashion looks like it was an effort to resemble tree furniture but does not actually look real. The present furniture not only looks real and very much like actual tree furniture but it is also very durable being molded with concrete and sprayed with a very durable epoxy coating of lasting finish. In addition, the present furniture solves some of the previous problems in the art such as how to attach heavy tops to heavy bases, how to prevent the splitting and cracking of heavy concrete tops and bases, how to make bases, tops and the like easily replacable if damage does occur and also how to mold such furniture and parts repeatedly using the same mold.

SUMMARY OF THE INVENTION

A simulated tree furniture comprising a tree trunk base of hollow interior construction having a connecting bracket on the upper end thereof employing structural members embedded in the concrete of the base and having a connection means thereon. The base mentioned in the preceding paragraph and a removable top having a simulated tree top and side edge and provided with attaching means which attaches to the bracket on the tree trunk base and employing structural strengthening members throughout the top.

The procedure for molding a base or other simulated tree furniture comprises making a plastic mold by taking a plastic impression from an actual tree part, supporting said plastic mold in a frame in which there is a mold support made from galvanized metal, positioning a removable core member within said plastic mold, pouring concrete around said core and inside said plastic mold, positioning a bracket and structural support in one end of said mold and removing said galvanized metal and said plastic mold from said molded concrete.

Other and further objects and advantages of this invention will become apparent upon reading the following description of a preferred embodiment taken in conjunction with the accompanying drawings.

BRIEF DESCRIPTION OF THE DRAWINGS

FIG. 6 is another form of a table top having a larger grid therein shown in full lines.

FIG. 7 is a perspective assembly view showing the assembly of a table top shown in FIG. 2 with a base of the sort shown in FIG. 1.

FIG. 8 is a perspective view of a composite mold for molding a base of the type shown in FIGS. 1 and 3 and turned on its side for removal or doffing of the mold and the molded concrete tree trunk.

FIG. 9 is an elevation view of the composite mold shown in FIG. 8.

FIG. 10 is a side elevation view of the urn or receptacle shown being molded in FIG. 8.

FIG. 11 is a side elevation view of the urn and plastic mold in FIG. 10 illustrating by lines with arrowheads the peeling or removal of the plastic mold for reuse.

DESCRIPTION OF THE PREFERRED EMBODIMENT

Figure 1:
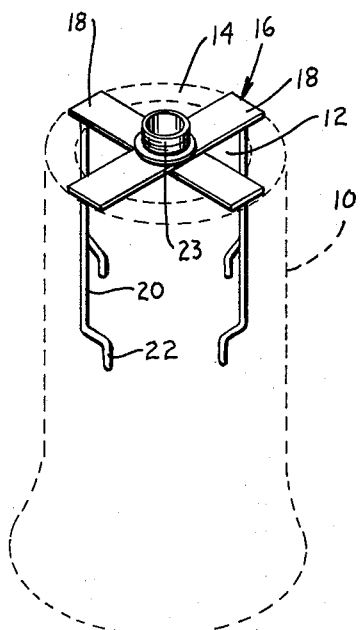
FIG. 1 is a perspective view of a simulated tree trunk base shown in dotted lines and the attaching bracket and structural strengthening member shown in full lines.

The simulated tree trunk base 10 in FIG. 1 is of hollow interior construction having a hollow core or center 12 about which there is a circular tree trunk body 14 molded of concrete and upon which there is the decorative simulated tree trunk appearance on the surface which is shown in FIG. 7. The tree trunk surface or appearance is accomplished by means of a molding process to be described later in connection with other figures of the drawings, it being understood that the surface of the body 14 does resemble a tree trunk. Embedded in the body 14 is a reinforcing support bracket 16 comprising a pair of welded cross plates 18 on which are mounted or welded protruding structural reinforcing members 20 each of which has a bent terminal end 22 thereon for purposes of structural support and to prevent the turning and twisting of the bracket 16 in the concrete of the body 14.

Figure 2:
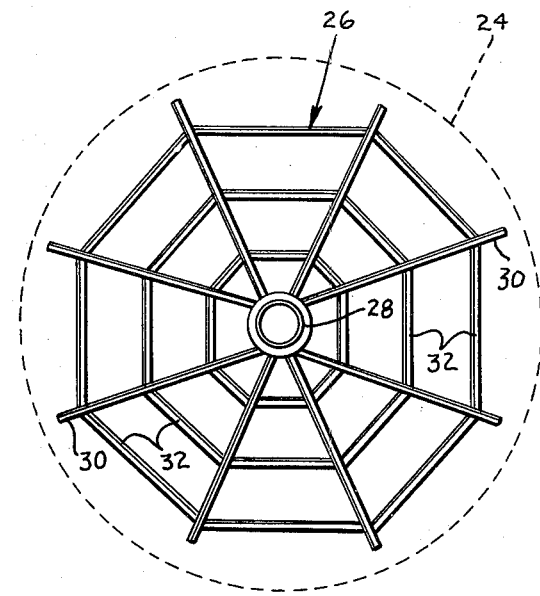
FIG. 2 is a top plan view of a simulated tree table top in dotted lines having the reinforced grid in full lines positioned therein to be molded therewith.

In FIG. 2 there is shown a top which is positioned on the base of FIG. 1 in the manner shown in FIG. 7. Top 24 is molded from solid concrete in which is encapsulated a structural grid 26 comprising a central attaching means in the form of a threaded socket 28 from which radiate a plurality of diagonal members 30 connected together at intervals by cross members 32 altogether creating somewhat of a "spider web" structural grid formation. The top 24 is mounted on the base 10 by screwing the socket 28 to the threaded sleeve 23 on base 10.

Figure 3:
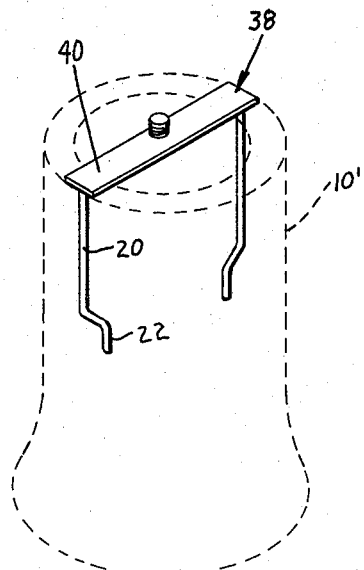
FIG. 3 is a perspective view of an alternative form of the base shown in FIG. 1 wherein there is a single plate bracket rather than the double plate bracket in FIG. 1.

In FIG. 3 there is shown an alternative form of base 10' of identical construction to the base 10 in FIG. 1 except that the bracket 16 in FIG. 1 is replaced by a single bracket 38 having one flat plate 40 on which are the same reinforcing members 20 welded thereto and having the identical ends 22.

Figure 4:
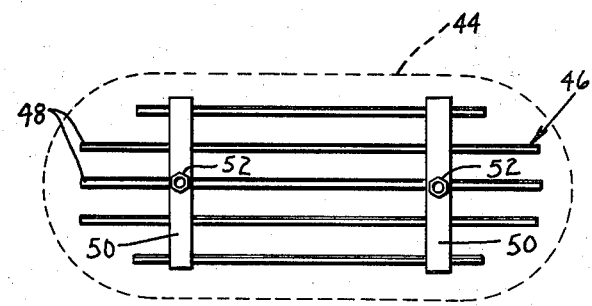
FIG. 4 is a top plan view of a larger table top which fits on two bases of the sort shown in FIG. 1 or 3 and having a structural strengthening grid therein.

In FIG. 4 there is shown a large concrete table top 44 which is molded from concrete and which has a large grid 46 therein constructed from a plurality of longitudinal members 48 connected together by transverse plate members 50 each of which has a threaded socket 52 welded thereto to be positioned and screwed onto a respective base 10 or 10' whereby the table constructed from the table top in FIG. 4 has two of the bases 10 or 10' supporting same.

Figure 5:
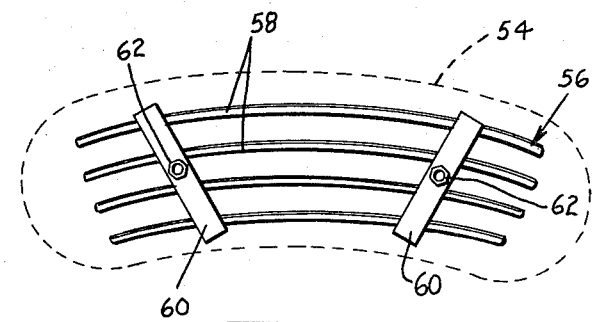
FIG. 5 is a top plan view of the seat of a bench shown in dotted lines and having a curved reinforcing grid therein shown in full lines.

In FIG. 5 there is shown a curved bench seat 54 molded from concrete and having a curved grid 56 therein comprising a plurality of curved grid members 58 connected by means of grid plates 60 each of which has a threaded socket 62 welded thereto.

In FIG. 6 there is shown a table top similar to the one in FIG. 4 but of stronger construction. Top 64 in FIG. 6 has a grid 66 therein which in the same fashion as the grid 46 in FIG. 4 comprises a plurality of longitudinal members 68 connected by transverse members 70 on which are respective bracket plates 72 having threaded sockets 74 thereon whereby the table top 64 may be assembled on a pair of bases 10 or 10' by screwing the respective threaded socket 74 onto the threaded post or sleeves 23.

In FIG. 7 there is shown a table top 24 on which the edge 78 resembles the bark of a tree and a molded concrete top 80 looks like the cross-sawn section through a tree trunk and having the usual age rings showing thereon. Likewise, the base 10 in FIG. 7 has the surface 82 thereof created to form a resemblance to the actual bark of a real tree. A bracket 86 inside top 80 comprises a plate 88, a nut 90, and a reinforcing cross-wire 92.

The molding of the different elements of the imitation tree furniture of the present invention is basically the same and in FIGS. 8 thru 11, inclusive, there has been selected for purposes of illustration, the molding of an urn or receptacle which is designated generally by reference numeral 100 and also has a decorative surface 102 resembling the bark of a tree. It is necessary to obtain a mold out of poured plastic material 104 by supporting an actual section of tree trunk (not shown), wrapping some material such as galvanized metal or the like a distance representing thickness away from the tree trunk and pouring between the galvanized material (not shown) and the tree trunk a plastic compound which hardens into a flexible plastic mold 104 which can be used repeatedly. Plastic molding compounds and formulas are available on the open market and suppliers can be found in THE THOMAS REGISTER of manufacturers and suppliers.

A frame shown in FIG. 8 is constructed from wood and comprises a rectangular top 106 and a bottom 108 connected together by wood staves or pieces 110 reinforced by internal braces 112 to support a generally circular section mold sleeve 114 of galvanized material which is removable. Bottom 108 is attached to a steel plate (not shown) approximately ⅛"×18"×18". The flexible plastic mold 104 is inserted inside of the galvanized mold sleeve 114 and a removable core 116 (made from plastic compound) is positioned down inside the mold 104 for removal later on. In making a tree trunk base 10 or 10' in the manner shown in FIG. 1 or 3 it is necessary to support the brackets 16 in the bottom of the mold by attaching same to the bottom plate 108 of the mold frame so that the members 20 extend upwardly. After the core 116 is in place in the manner shown in FIG. 9, liquid concrete is poured around the space between the mold sleeve 114 and the core 116 and permitted to harden so that the entire mold frame may be turned on its side or turned upside down, shaken to break the concrete loose, the core 116 is removed, the galvanized metal sleeve 114 is removed with the concrete tree trunk 10 therein as shown in FIG. 10 and then the plastic mold is peeled away in the manner shown in FIG. 11.

While I have shown and described a particular embodiment of this invention this is by way of illustration only and does not constitute any sort of limitation on the scope of the invention since various alterations, deviations, changes, eliminations, substitutions, additions, and departures may be made in the embodiment shown without departing from the scope of the invention as defined only by proper interpretation of the appended claims.

What is claimed:

1. A method of molding simulated tree furniture comprising:
   constructing a flexible mold by molding a plastic molding material around actual portions of a tree whereby one surface of the mold is complementary to and corresponds to the bark surface of the tree so that the flexible mold can be used to reproduce the identical tree portions;
   constructing a mold frame having a top and a bottom connected together by frame members and a removable mold sleeve such as flexible galvanized metal mounted between said top and said bottom;
   placing said flexible mold against the inside surface of said removable mold sleeve so that said one surface corresponding to the bark surface of the tree faces away from the inside surface of said removable mold sleeve;
   positioning a removable central core member within said removable mold sleeve leaving a space between said removable central core member and said flexible mold to receive concrete poured therein;
   supporting a bracket partially in said space between said removable central core member and said flexible mold on said mold frame;
   pouring concrete into the space between said removable central core and said flexible mold;
   curing said concrete;
   removing said removable central core member and said removable mold sleeve from said mold frame and peeling said flexible mold from said concrete to form hollow simulated tree furniture.

2. The method claimed in claim 1 including positioning a connecting bracket in said mold frame prior to pouring said concrete therein, said connecting bracket having projecting means extending into said space in which said concrete is poured to become embedded therein as a permanent part of said simulated tree furniture.

3. The method claimed in claim 2 wherein said projecting means have bent ends.

* * * * *